Jan. 5, 1937.  P. JEPSON  2,066,567
PEACH PITTER
Filed March 12, 1934   3 Sheets-Sheet 1
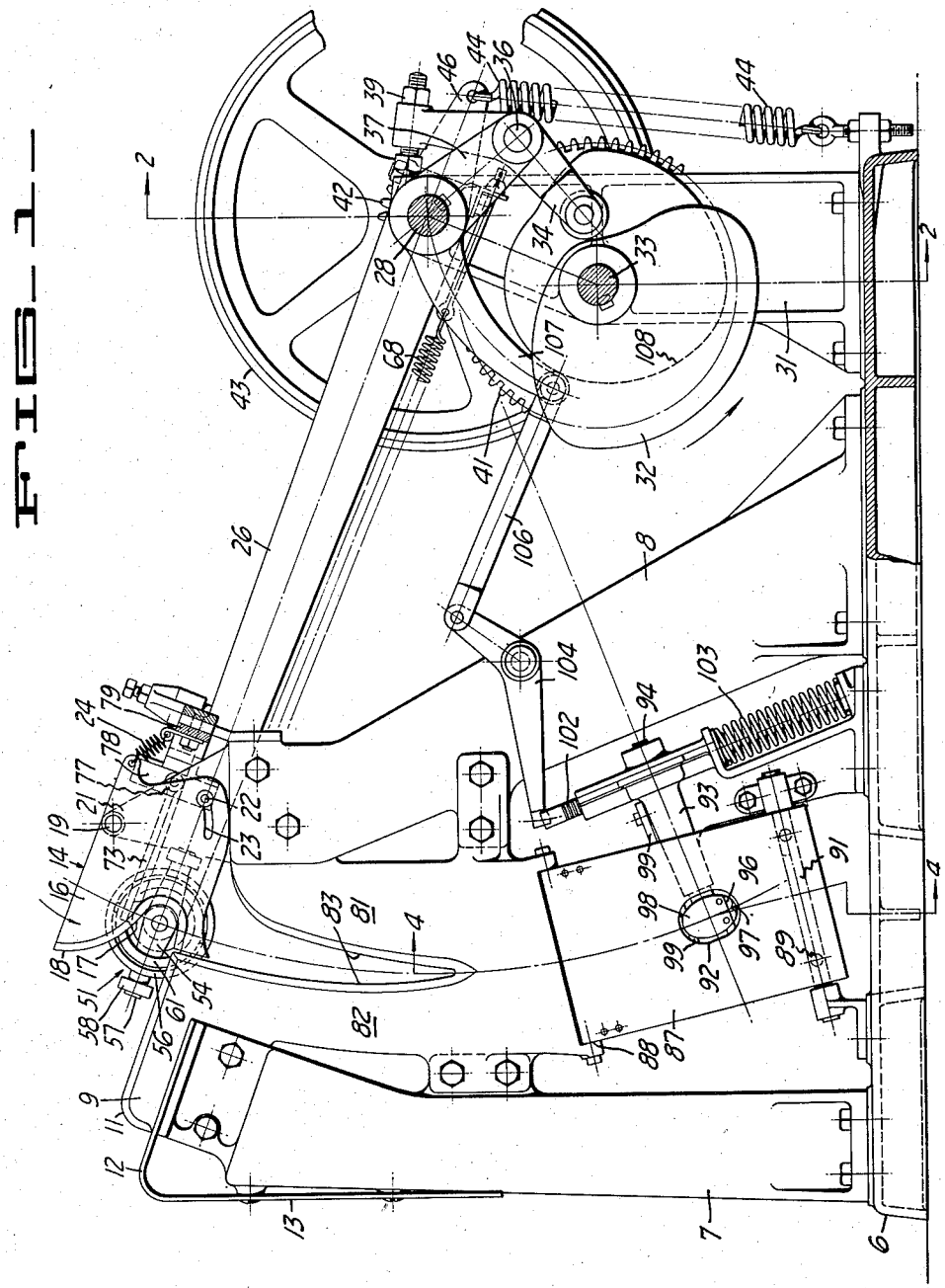
INVENTOR
Percy Jepson
BY
ATTORNEYS Jan. 5, 1937. P. JEPSON 2,066,567
PEACH PITTER
Filed March 12, 1934 3 Sheets-Sheet 2
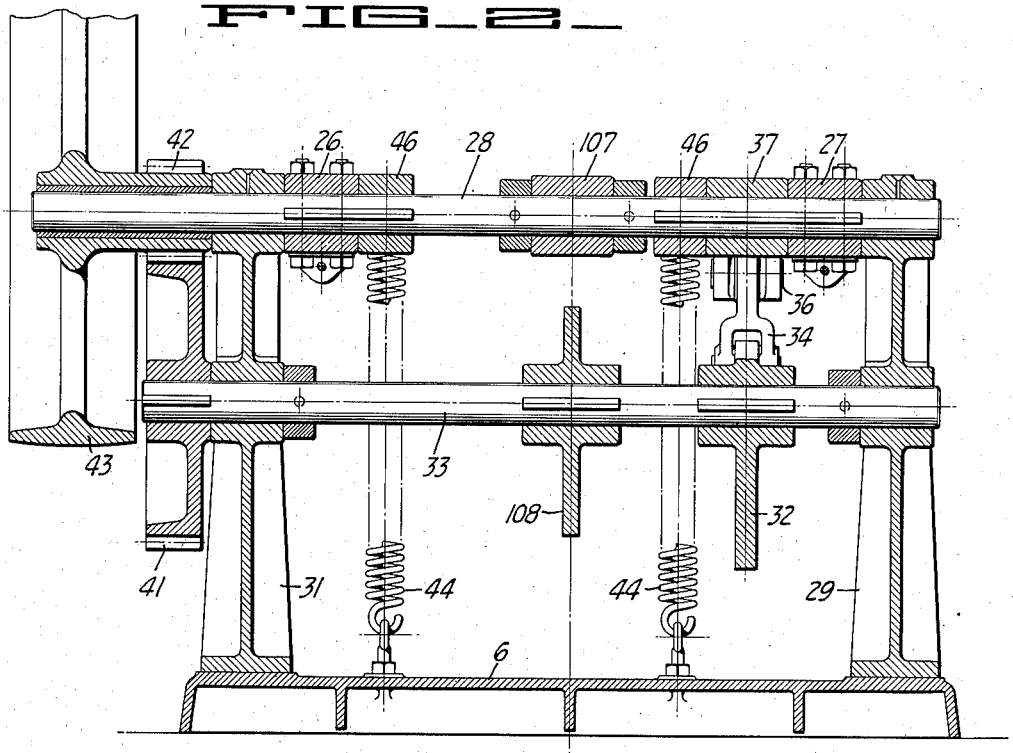
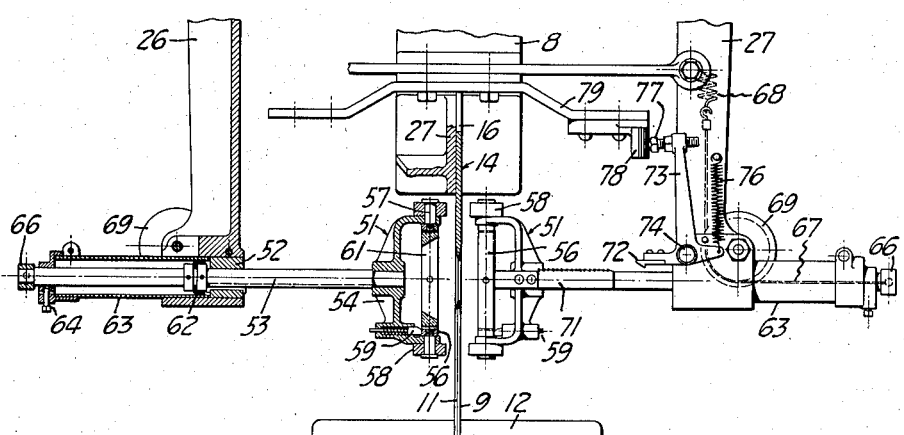
INVENTOR
Percy Jepson
BY
White, Prost, Fleher & Lothrop
ATTORNEYS

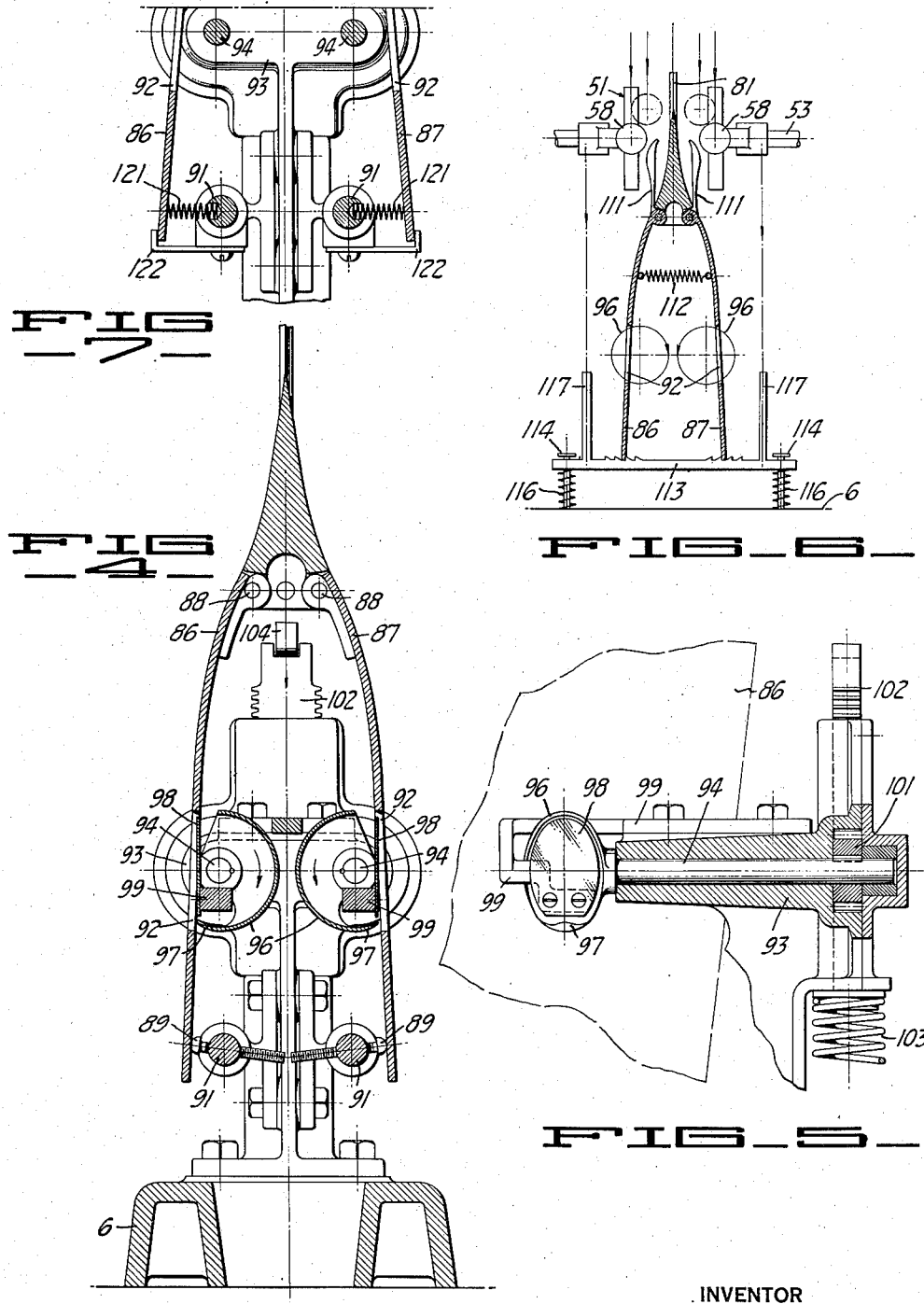

Patented Jan. 5, 1937

2,066,567

UNITED STATES PATENT OFFICE 2,066,567

PEACH PITTER

Percy Jepson, San Francisco, Calif., assignor to Pacific Machinery Company, San Francisco, Calif., a corporation of California Application March 12, 1934, Serial No. 715,052

11 Claims. (Cl. 146—28)

My invention relates to means for removing the pit from a fruit, such as a peach.

An object of my invention is to provide a peach pitter which is effective to remove the pit from fruit such as a peach in a commercially satisfactory way.

Another object of my invention is to provide a peach pitter in which the usual run of fruit, regardless of size and regardless of the condition of the pit, can be easily handled for pitting.

A further object of my invention is to provide a peach pitter which is especially adapted for use by an operator.

The foregoing and other objects will appear from the embodiment of the invention as shown in the accompanying drawings in which—

Figure 1 is a side elevation of a peach pitter constructed in accordance with my invention, certain parts of the mechanism being removed to disclose more clearly the operation of the machine.

Figure 2 is a cross-section the planes of which are indicated by the lines 2—2 of Figure 1.

Figure 3 is a plan of the mechanism adjacent the receiving station, certain portions being broken away to disclose their construction in cross-section.

Figure 4 is a cross-section on the lines 4—4 of Figure 1.

Figure 5 is an enlarged fragmentary view, portions being in section, of one of the pitting knives and associated mechanism.

Figure 6 is a view similar to Figure 4 but showing a modified arrangement of the divider plates.

Figure 7 is a view similar to Figure 4 but showing a modified arrangement of the divider plate spacers.

In its preferred form the peach pitter of my invention comprises means for receiving a peach at a receiving station, with the peach arranged in a predetermined position with respect to the machine, together with a pitting means at a pitting station adapted to cut the pit from the fruit, all combined with means for transferring the received fruit to the pitting station while maintaining the fruit in the predetermined position and while severing the fruit into two halves.

The peach pitter of my invention comprises a base 6 on which there is mounted a pair of uprights 7 and 8. Mounted on the uprights 7 and 8 is a peach-receiving mechanism, shown as it is located in the peach-receiving station. The mechanism includes an initial impaling blade 9 which is generally planar and disposed in a generally vertical plane. The blade 9 is sharpened along its exposed edge 11 and is flanked by a table 12 formed into a guard plate 13 for the operator and fastened to the upright 7. Peaches which are to be pitted are impaled on the blade 9 with the plane of the suture of the peach coincident with the plane of the blade 9. The peaches are impaled preferably with the stem end vertically downward and, after impaling on the blade 9, are advanced therealong manually by the operator until they arrive at a positioning means 14.

This positioning means includes a relatively thin planar plate 16 which is coplanar with the blade 9 and which is provided with a notch 17 especially contoured to approximate the shape of a peach pit. The plate 16 is sharpened along its exposed edge 18 and is mounted pivotally by a through-pin 19 carried in a bracket 21 fastened on the upright 8. The plate 16 is limited in its pivotal movement about the pin 19 by a stop 22 projecting through a slot 23 in the plate, while normally the plate 16 is held with the notch 17 in general registry with the edge 11 of the blade 9 by a coil spring 24. Because of this positioning plate 16, the peach, when forced into position with its pit closely lying in the notch 17, is exactly centered or placed in a predetermined position with respect to the machine; that is, with the stem end of the pit in contact with the edge 18 of the plate 16 and with the plane of the suture coincident with the plane of the plate 16.

In order to advance a peach from the receiving station, I provide a pair of arms 26 and 27 each of which is mounted on a shaft 28 carried by standards 29 and 31 mounted on the base 6. The shaft 28 is oscillated, carrying the arms 26 and 27 with it, by means of a cam 32 mounted on a rotatable shaft 33 and abutting a cam follower arm 34 pivoted as at 36 on an extension 37 fixed to the shaft 28. A set-screw mechanism 39 adjusts the relationship between the shaft 28 and the cam 32. The shaft 33 is driven in any suitable way at a constant speed of rotation, in the present instance through gears 41 and 42, the latter of which is connected to a belt pulley 43. The follower 34 is maintained in contact with the cam 32 and the arms 26 and 27 are urged toward their uppermost position by means of coil springs 44 interposed between extensions 46 on the arms and the base 6.

The forward extremity of each of the arms 26 and 27 is provided with a peach-holding cup, generally designated 51; and since the cups are alike, but one need be described. Passing through a keyed bushing 52 mounted in the arm 26, for instance, is a shaft 53 at its inner end carrying a yoke 54 within which is mounted a gimbal ring 56 by means of pins 57 on which rollers 58 are rotatably mounted. The gimbal ring 56 is urged toward central position by a spring-pressed plunger 59 mounted in the yoke 54 and bearing against the ring 56. An inner ring 61, pivoted to the ring 56 at right angles to the pins 57, contacts the peach. At its opposite extremity a rod carries a piston 62 moving in a dashpot cylinder 63 mounted on the arm 26, for instance, and communicating with the atmosphere through an orifice controlled by an adjustable valve 64 to regulate the speed of operation of the cup. An anchor 66 on the shaft 53 holds a cable 67 connected to a coil spring 68 adjustably mounted for urging the cups 51 mutually to approach each other, the cable 67 passing over a rotatably mounted pulley 69 on the arm 26, for instance.

I provide means for latching each of the cups in spaced-apart or outward position against the urgency of the spring 68, and therefore mount on the yoke 51 a ratchet bar 71 with which is adapted to engage a pawl 72 projecting from one arm of a bell crank 73 pivoted as at 74 on one of the arms 26 or 27. The arm 73 is urged into engagement with the ratchet 71 by a coil spring 76, but is released from such engagement against the urgency of the spring 67 by interengagement of an adjustable follower 77 on the arm 73, and a cam shoe 78 carried at the extremity of a bracket 79 fastened on the upright 8.

Thus, as the arms 26 and 27 are moved toward uppermost position by rotation of the cam 32, the cups 51, being in outermost position and held therein by the latch 72, are released at a predetermined point by contact of the follower 77 with the cam shoe 78, to lift the pawl or latch 72 from the rack 71 and permit the springs 68 to push the cups 51 toward peach-engaging position, their speed of approach being governed by the dashpot 63. In innermost position the cups grasp a fruit positioned in the notch 17 and, as the arms 26 and 27 immediately thereafter begin to descend under urgency of the cam 32, the peach is moved relatively downwardly in the machine and causes a pivotal oscillation of the plate 14 about its pivot point 19, so that the peach pit travels in a curvilinear path but with its relative position maintained. When the peach has passed far enough toward the bottom of the machine to clear the notch 17, the spring 24 returns the pivoted plate 14 to its original position, ready for receipt of a subsequent peach.

As the peach continues its downward progress under the urgency of the arms 26 and 27, it rides on a continuation 82 of the blade 9 and is impaled upon a blade 81 which converges with respect to the portion 82 of the blade 9 to form a relatively narrow slot defined by sharpened edges 83, so that the edges enter into the pit of the fruit and are effective not only to cut the peach flesh into two portions but likewise to sever the pit into two halves.

The two halves of the peach continue their downward travel, and each of them is directed over an appropriate one of a pair of divider plates 86 and 87 which are identical and therefore but one is described. The divider plate 87, for instance, is pivoted at its upper end 88 and at its lower end bears against an adjustable stop 89 carried in a shaft 91 fixed to the base member 6. The plate 87 is pierced by an oval aperture 92 over which the half peach is placed by the cup in its lowermost or pitting position. When the peach is so positioned, a pitting operation takes place at the pitting station.

Rotatably mounted in a supporting boss 93 is a shaft 94 carrying a pitting knife 96. This knife is substantially a hemispherical shell in contour and preferably carries a relatively pointed central entering prong 97. The knife 96 is adapted to fit relatively closely with the boundaries of the aperture 92 and is likewise adapted to rotate closely around a central plate 98 of generally oval contour, which is preferably of spring material and is resiliently mounted on a bracket 99 fastened to the boss 93. The plate 98 makes a relatively close fit with the interior surface of the pitting knife 96 to afford a shearing action therewith.

The shaft 94 carries a pinion 101 which is in mesh with a rack 102 reciprocable in the framework 93 and which is urged into uppermost position by a coil spring 103. When the peach halves are positioned over the apertures 92 the shafts 94 are rotated by reciprocation of the rack 102. Such motion is effected by a bell crank 104 pivoted on the standard 8 and driven through a link 106 connected to a cam follower 107 bearing on a cam 108 journaled on the shaft 33. The cam 108, therefore, at a proper time in its rotation moves the follower 107 and, through the link 106, oscillates the bell crank 104 and depresses the rack 102 against the urgency of the spring 103, thereby rotating the pitting knives 96 for substantially a half turn, so that the pointed portion 97 enters the flesh of the half peach and cuts around the half pit, severing the pit from the flesh of the fruit.

A slight additional travel downwardly of the arms 26 and 27 causes the rollers 58 to ride on the plates 86 and 87 thereby spacing the cups a predetermined distance apart, in which location they are latched by the catches 72 and retained. The peach halves, properly pitted, are therefore released as the arms 26 and 27 return to their original position to repeat the cycle, and the resilient or spring plates spring slightly to dislodge the halved peach pit thereon as the knives 96 return to their original position.

In Figure 6 there is shown a mechanism for automatically affecting the depth of cut made by the pitting knives in accordance with the size of the peach,—that is to say, the larger the peach half being pitted, the deeper the cut. This mechanism is in many respects comparable to that shown in Figure 4, and the identical parts carry the same reference numerals. In this modification, however, each of the plates 86 and 87 carries a cam arm 111 which is in the path of descent of one of the rollers 58. The plates are normally urged toward each other by a coil spring 112, so that the arms 111 are forced relatively apart, in which position of the parts the deepest cut is made by the knives 96.

As the cups descend, however, and approach the position shown in Figure 6, they are spaced varying distances from the center plate 81, in accordance with the size of the particular half fruit at the moment retained by them. The roller 58 therefore forces the arm 111 relatively inward against the light urgency of the spring 112, correspondingly moving the plates 86 and 87 outwardly or apart. In such outward movement the plates ride over the teeth of a ratchet bar 113 which is bodily movable in a vertical direction on a pair of pins 114 mounted on the base 6 and movable against the urgency of coil springs 116. The plates are then properly held in the correct outer position for a proper depth of cut, depending upon the size of the individual fruit. After the fruit has been properly pitted, the further downward movement of the cups causes them to contact a pair of lugs 117 on the bar 113, depressing the bar and releasing the engagement of the ratchet teeth with the lower edge of the plates 86 and 87, consequently releasing the plates to move inwardly to their innermost position. Since the cups are relatively far apart upon their return movement, they ride past the arms 111 without contacting them until the subsequent downward operation.

As an additional modification of the mechanism shown in Figure 4, I in some instances prefer to replace the adjustable stops 89 with coil springs 121 bearing against the plates 86 and 87 and forcing them in general outwardly against adjustable stops 122 to limit the outermost position of the plates and, correspondingly, the shallowest cut the pitting knives will make. In the operation of this structure, when the peach is in place and the pitting knife originally enters the flesh, in the event the shallowest possible cut which can be made by the machine is not sufficient to clear the pit, the knife rides over the pit and forcibly pulls the plates 86 and 87 inwardly against the urgency of the springs 121 and, following the contour of the pit, effects the pitting operation, after which the plates 86 and 87 return to their outermost position against the stops 122.

I claim:

1. A peach pitter comprising a frame, an impaling plate pivoted on said frame, means for urging said plate into receiving position, an initial impaling blade in alignment with said plate in said receiving position, means for removing a peach impaled on said plate in a direction angularly related to said impaling blade while effecting pivotal movement of said plate, means for bisecting said removed peach, and means for pitting said bisected peach.

2. A peach pitter comprising a frame, an impaling plate pivoted on said frame to move between a receiving position and a discharging position, an initial impaling blade in alignment with said impaling plate in said receiving position, a bisecting blade coplanar with said impaling plate but angularly related thereto when in said discharging position, means for urging said plate into said receiving position, and means for advancing a peach impaled on said plate to said bisecting blade while pivoting said plate from said receiving position to said discharging position.

3. A peach pitter comprising a frame, an impaling plate pivoted on said frame to move between angularly related receiving and discharging positions, an initial impaling blade in alignment with said impaling plate in said receiving position, a bisecting blade in alignment with said impaling plate in said discharging position, a pair of diverging separator plates merging with said bisecting blade, said plates having apertures therein, means for advancing a peach impaled on said impaling plate onto said bisecting blade and to said separator plates, and means effective through said apertures for pitting said peach.

4. In a peach pitting machine, an impaling blade having two portions intersecting at an angle to each other, a pivotally mounted positioning plate having a notch arranged to receive a peach from the first portion of the impaling blade and by means of the pit positioning notch to align the pit of the peach in predetermined relation with the impaling blade, and means for advancing the peach and simultaneously swinging the positioning means to present the peach to the second portion of the impaling blade.

5. In a peach pitting machine, a plate for supporting the cut surface of one half of a bisected peach and said plate having an elliptical aperture, an elliptical central plate supported within the aperture and spaced therefrom to leave a relatively narrow oval slot, and an elliptical pitting knife mounted for rotation about an axis parallel to said surface and adapted to operate through said slot to afford shearing action with the edge of the plate aperture and the peripheral edge of the central plate.

6. In a peach pitting machine, a plate for supporting the cut surface of one half of a bisected peach, a pitting plate having one end pivotally related to the supporting plate and having a pitting aperture, a pitting knife operable through said aperture, means for advancing the peach half from the supporting plate along said pitting plate and into registration with the aperture, and means actuated by the advancing means for swinging the pitting plate proportionally to the size of the fruit half moved into registration with the aperture and to thereby adjust the pitting plate with relation to the pitting knife for controlling the depth of cut to be taken in the fruit half during the pitting operation.

7. In a peach pitting machine, a plate for supporting the cut surface of one half of a bisected peach, a pitting plate having one end pivotally related to the supporting plate and having a pitting aperture, a pitting knife operable through said aperture, means for advancing the peach half from the supporting plate to register with the aperture of the pitting plate, means actuated by the advancing means for adjusting the pitting plate to the pitting knife proportionally to the size of fruit half advanced, and means for locking the pitting plate in its adjusted position during the operation of the pitting knife.

8. In a peach pitting machine, a plate for supporting the cut surface of one half of a bisected peach, a pitting plate having one end pivotally related to the supporting plate and having a pitting aperture, a pitting knife operable through said aperture, means for advancing the peach half from the supporting plate to register with the aperture of the pitting plate, means actuated by the advancing means for adjusting the pitting plate to the pitting knife proportionally to the size of fruit half advanced, means for locking the pitting plate in its adjusted position during the operation of the pitting knife, and means for releasing the locking means upon the completion of the pitting operation.

9. In a peach pitting machine, a plate for supporting the cut surface of one half of a bisected peach, a pitting plate having one end pivotally related to the supporting plate and having a pitting aperture, a pitting knife operable through said aperture, means for yieldly clamping the peach half to the supporting plate and operable for advancing the fruit half into register with the aperture of the pitting plate, and means actuated by the clamping means during the advancing portion of its operation for adjusting the pitting plate to the pitting knife proportionally to the size of fruit half advanced.

10. In a peach pitting machine, a plate for supporting the cut surface of one half of a bisected peach, a pitting plate having a pitting aperture, a pitting knife operable through said aperture, means yieldingly urged toward the supporting plate for clamping a half peach thereon and maintained spaced from the supporting plate by the engaged peach half a distance proportional to the diameter of the engaged peach, means actuating the clamping means for advancing the half peach into registration with the aperture, and means actuated by the clamping means for causing a relative movement between the pitting plate and knife proportional to the diameter of the peach half advanced to control the depth of cut to be taken by the knife in the fruit during the pitting operation.

11. In a peach pitting machine, a plate for supporting the cut surface of one half of a bisected peach, a pitting plate having a pitting aperture, a pitting knife operable through said aperture, means yieldingly urged toward the supporting plate for clamping a half peach thereon and maintained spaced from the supporting plate by the engaged peach half a distance proportional to the diameter of the engaged peach, means actuating the clamping means for advancing the half peach into registration with the aperture, means actuated by the clamping means for causing a relative movement between the pitting plate and knife proportional to the diameter of the peach half advanced to control the depth of cut to be taken by the knife in the fruit during the pitting operation, and means for locking the pitting plate and knife in adjusted position during the pitting operation.

PERCY JEPSON.